March 29, 1966 R. WESTFALL 3,242,782
AUTOMATIC MANIPULATOR
Filed Nov. 18, 1963 2 Sheets-Sheet 1

Robert Westfall
INVENTOR.
BY R. Frank Smith
David P. Ogden
ATTORNEYS

March 29, 1966 R. WESTFALL 3,242,782
AUTOMATIC MANIPULATOR
Filed Nov. 18, 1963 2 Sheets-Sheet 2

Robert Westfall
INVENTOR.

BY R. Frank Smith
David P. Ogle
ATTORNEYS

United States Patent Office 3,242,782
Patented Mar. 29, 1966

3,242,782
AUTOMATIC MANIPULATOR
Robert Westfall, Rochester, N.Y., assignor to Eastman Kodak Company, Rochester, N.Y., a corporation of New Jersey
Filed Nov. 18, 1963, Ser. No. 324,295
16 Claims. (Cl. 83—151)

This invention relates to an automated manipulator suitable for conveying a component to a subassembly and performing distinct assembly operations thereon.

According to the general principles of the present invention, an assembly machine is adaptable for a variety of applications but is particularly useful for automatic assembly wherein relatively short runs of relatively complex devices are being assembled. In presently known automated assembly systems, it is a practice to provide specially designed tools and handling devices to accomplish a specific assembly operation. Such an assembly line is able to produce only a single item, and any changes of that item require substantial modification of the assembly line equipment. In the production of items involving millions of dollars in end product, it is feasible to design special machine tools for each operation of each product line. However, in assembling products involving thousands or even hundreds of thousands of dollars, tooling costs can become excessive if the equipment is completely obsolete when a particular product run is completed.

The need has long existed for a versatile part handling and tool manipulating device which is capable of picking up a part for an assembly and transporting it to a specific location and is equally capable of securing the part by welding, soldering, bolting, thermoplastic sealing and like methods, and which device is easily and economically convertible from one type of assembly operation to another as well as having a particular operation easily modified.

As explained in some detail in the copending patent application Serial No. 467,175 the simple and reliable assembly arrangement may be easily adaptable to perform a variety of programmed operations. However, with a universal assembly arrangement of that type, it is, of course, necessary to provide novel tools which will accomplish the details of the assembly operation.

It is, therefore, an object of the present invention to provide a simple and reliable tool assembly machine for severing and placing an element in a subassembly being fabricated.

It is a further object to provide a simple and reliable part handling device.

One environment of the present invention includes a stepping motor, having several hundred discrete programmable steps per revolution thereof, for driving a linkage system to selectively energize a laterally slidable member, a serrated wheel which is rotatable thereon, or a tool slide which is movable radially across the serrated wheel. The sprocket ratios are selected so that the position of the tool slide is controllable in discrete steps of the order of 1/32 of an inch, and its angle of attack is controllable within about a degree.

In accordance with the present invention, on the tool slide is mounted, selectively, a component-handling implement and on the serrated wheel is provided a cutter means. A major subassembly component being worked on is precisely located within the region of movement of the tool securable to the tool slide so that the functions being performed on the subassembly component may be performed in a precisely preselected location thereon. The component handling implement and the cutter means are arranged to co-operate in positioning a component and then separate it from the stock of which it forms a part, or conversely severing the component and then placing it at a preferred location.

The subject matter which is regarded as my invention is particularly pointed out and distinctly claimed in the concluding portion of this specification. The invention, however, as to its organization and operation together with further objects and advantages thereof, will best be understood by reference to the following description taken in connection with the accompanying drawings in which:

Figure 1:
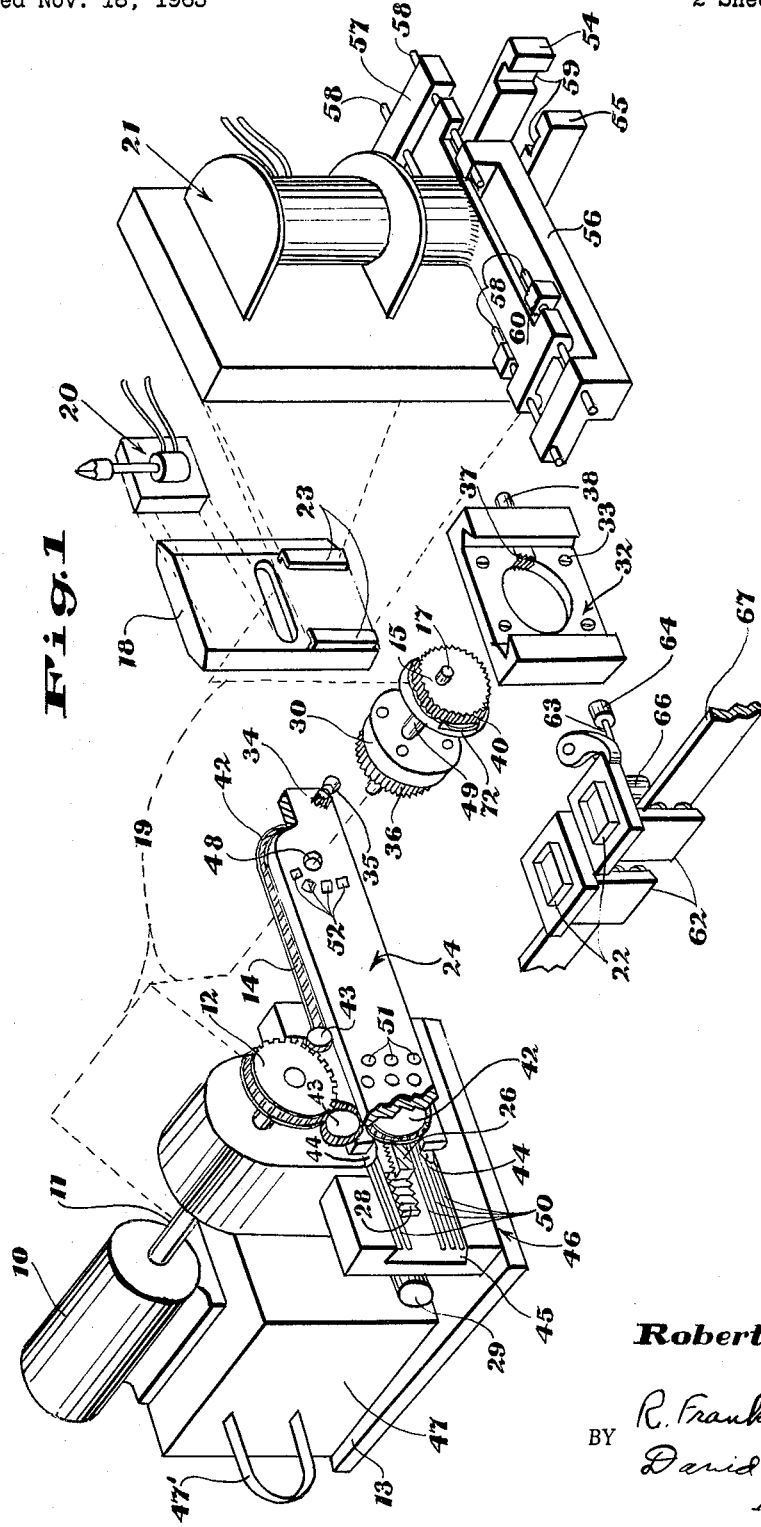
FIG. 1 is an exploded perspective view, partially in section, of one embodiment of a machine arranged to use the present invention.

Referring now to the drawings, wherein like numbers refer to similar parts, I have shown in FIG. 1 a stepping motor 10 coupled by a drive shaft 11 to a sprocket 12. Obviously, the stepping motor 10, the drive shaft 11, and the sprocket 12 could be replaced by other types of precisely controllable transducers such as stepping relays and the like. These parts are each secured in a conventional manner to a bedplate 13 or the like which may be oriented in accordance with a particular work function to be performed.

The sprocket 12 is arranged to drive a nonslipping belt or chain 14, which in turn, drives a serrated wheel 15. Coupled to the wheel 15 is a drive rod 17 having a cam roller thereon which selectively drives a tool slide 18. The primary drive connection as indicated by the dashed lines 19 is from the motor 10, through the shaft 11, the sprocket 12, the chain 14, the serrated wheel 15, and the rod 17 to the tool slide 18.

On the tool slide 18 may be positioned various tools such as a soldering iron 20 or a clamping arrangement 21 for holding a component and operable by a pick-up solenoid selectively positionable to operate on a subassembly component 22. The clamping arrangement 21 is enlarged slightly relative to the other components of FIG. 1 to more clearly illustrate its construction. Also as will become apparent from the following discussion, it is preferred that the clamping arrangement 21 be resiliently supported in guide ways 23.

It will become apparent to those skilled in the art of machinery that applying force from the sprocket 12 to the tool slide 18 will not necessarily cause a predeterminable movement thereof. For instance, the chain 14 may simply move a laterally movable element in the form of a main slide 24 toward the right as shown in FIG. 1, without causing rotation of the serrated wheel 15. This movement of the main slide 24 is preventable by engagement of a serrated strip 26 on the back of the main slide 24 by a serrated locking pawl 28 under the control of a solenoid 29. Such locking of the main slide 24 causes the chain 14 to expend its energy elsewhere.

However, it is still not determined what effect will be developed between the drive rod 17 and the tool slide 18. A rotatable element shown in the form of a serrated wheel 30 may rotate freely, whereby the tool slide 18 will rotate therewith instead of being extended, or the wheel 30 may remain stationary, whereby rotation of the serrated wheel 15 causes the drive rod 17 to move the tool slide 18 upward or downward in its guide 32 which is nonrotatably secured to the wheel 30 by bolts 33 or the like. Selection of one of these two motions is accomplished by a serrated locking pawl 34 under the control of a solenoid 35 which engages the serrations 36 of the wheel 30 or by a serrated locking pawl 37 under the control of a solenoid 38 which engages serrations 40 of the serrated wheel 15. The tooth to tooth pitch of the serrations of the several locking means is selected to match the step distance developed by the stepping motor 10 and the sprocket 12.

Thus, by selective operation of two of the three solenoids 29, 35, and 38, a single mode of operation of the tool slide 18 is assured. For instance, with solenoids 35 and 38 energized, the serrated wheel 15 is locked against rotation and forms a portion of a driving connection between the chain 14 and the main slide 24.

As illustrated, the main slide 24 supports a main portion of the chain 14 on a pair of sprockets 42 spaced to maintain its tension in co-operation with a pair of idlers 43. At such time as the driving of the chain 14 by the motor 10 causes the main slide 24 to move laterally over the bed-plate 13 a pair of guide rails 44 supportingly transport it in a channel 45 provided in a support block 46.

Instead of a sliding support, ball bearing supports of the main slide 24 may be used. Alternately a larger stepping motor may be used or a plurality of synchronized stepping motors. As will become apparent from the following discussion, it is requisite to my invention that the drive means (10) does not get seriously out of phase with its control signals developed, by way of example, from a tape reader arrangement 47 using a punch tape 47'.

Once a desired lateral position has been attained, the motor 10 is stopped, and the serrated locking pawl 28 is energized by the solenoid 29 to engage the serrated strip 26 and fix the location of a main bearing 48 for supporting a central shaft 49 of the wheel 30.

As shown in FIG. 1, the main slide 24 and the support block 46 are provided with a recess to accommodate the chain 14, the sprockets 42, and electric power and sensing circuit means including commutator bars 50 and carbon brushes 51. I prefer that the commutator bars 50 be of the printed circuit type. Similar brushes 52 transfer electrical energy to the region of the tools 20 and 21. It should be noted that the chain drive arrangement allows simple reversal of the tool slide 18 to form right hand or left hand machines. Thus, two machines may operate simultaneously on a single subassembly component 22. When appropriate, they may be operated from the same punch tape 47' and be placed face to face on a bedplate 13 or on two aligned bedplates 13. Of course, with such reversal of the main slide 24, it is often necessary to relocate motion limit stops (not shown), and the like.

Once the desired angle of approach is obtained by rotation of the serrated wheel 30, the motor 10 is again stopped, the serrated pawl 34 is energized by the solenoid 35 to lock the wheel 30 against further rotation. Once the wheel is locked against further rotation, the solenoid 38 may be released whereby the chain 14 may drive the tool slide 18 downward to position the pick-up arrangement 21 in a working location. When the clamping arrangement 21 is positioned so that its jaws 54 and 55 lie on both sides of a part to be raised, the solenoid is energized by means of the energy transmitted through the commutator bars 50 to cause the jaws 54 and 55 and their respective support slides 56 and 57 to clamp the part therebetween. As indicated at 59 the jaws 54 may be notched or shaped to handle, with greater facility, a particular shape or size component. The slides 56 and 57 are slidably supported on a plurality of dowels 58 which are preferably press-fit secured to a horizontal main support 60. Although the support 60 is referred to herein as horizontal it is obvious from the above discussion that it will rotate with the tool slide 18.

Once the jaws 54 and 55 have grasped a part, the tool slide 18 is raised as necessary for the part to clear the subassemblies 22. Then the main slide 24 is driven to a preselected location over one of the subassemblies 22 where the tool slide 18 is lowered and the part is released to drop into its proper location or placed in its proper location, as by a press fit, and then released.

Once a particular subassembly station has completed the specific operations programmed, the subassembly 22 on a pallet 62 is released by a latch 63 under the control of a solenoid 64. Upon release of the pallet a motor 66 drives the pallet along an endless monorail 67 and a similar motor on a next pallet moves a similar subassembly to the specific location adapted to receive the component as programmed at this subassembly station.

Figure 2:
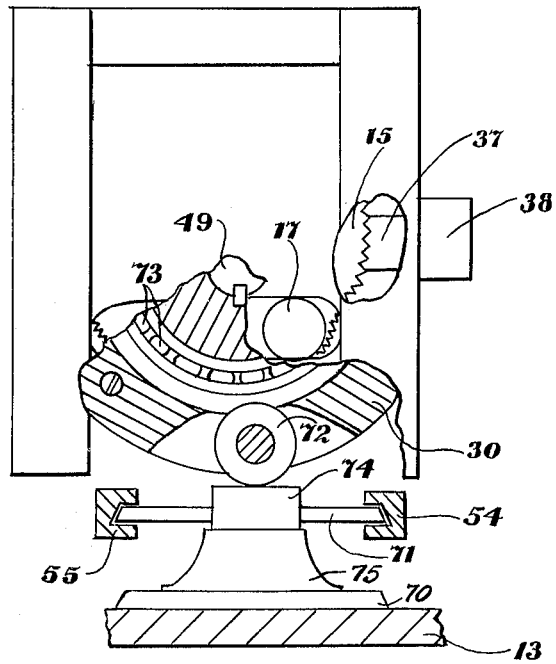
FIG. 2 is an elevation view partially in section of the cutter means shown in FIG. 1.

Referring now to FIG. 2, I have shown one means for severing an element or component in the form of a face plate 70 from a prepunched strip 71 containing a plurality of similar face plates joined together by relatively small unpunched linkage tabs (not shown). As indicated in FIG. 1, an actuating roller 72 extends partially from the peripheral surface of the serrated wheel 15 which is journaled in a hub of the serrated wheel 30 by ball bearings 73. This actuating roller, as indicated in FIG. 2, is arranged to engage a punch 74 cooperating with a die bar 75 supported directly on the solid bedplate 13. The cutting operation of the cutting assembly 74–75 is most easily accomplished by rotating the wheel 30 until the actuating roller 72 contacts the punch 74 as the roller approaches its lowermost position. Thus, the punch 74 is driven downward to extend below the cutting surface of the die bar 75 where the roller 72 attains the greatest mechanical advantage because of its sinusoidal vertical movement. With a single face plate 70 extending beyond the cutting surface, the tabs will be severed as the tool slide 18 completes its downward stroke and the face plate 70 will fall to the lower position indicated in FIG. 2. With the face plate in this lowered position, the wheel 30 is rotated to position the jaws 54 and 55 along the outer edges of the face plate 70 whereupon the solenoid is energized.

As illustrated, the particular piece being severed has downwardly tapered edges. If the bedplate 13 is provided with appropriate slots (not shown), the jaws 54 and 55 are lowered therein to grasp the edges of the face plate 70. However, changes in size, etc. of the face plate will result in a need for additional slots in the bed plate 13.

Because of this problem, a preferred arrangement is to grasp the face plate 70 by jaws 54 and 55 of the clamping arrangement prior to severing it. Such operation also reduces the cycle time. However, such simultaneous movement of the actuating roller 72 and the tool slide 18, utilizes a substantial amount of overdrive of the clamped clamping arrangement 21 in the guide ways 23 during the final actuating roller stroke of the serrated wheel 15 and its drive rod 17. It should be understood that such overdrive is relieved when the face plate severance is complete. Thereafter, suitably selected motions of the assembly machine will position the face plate 70 and the subassembly 22.

Figure 3:
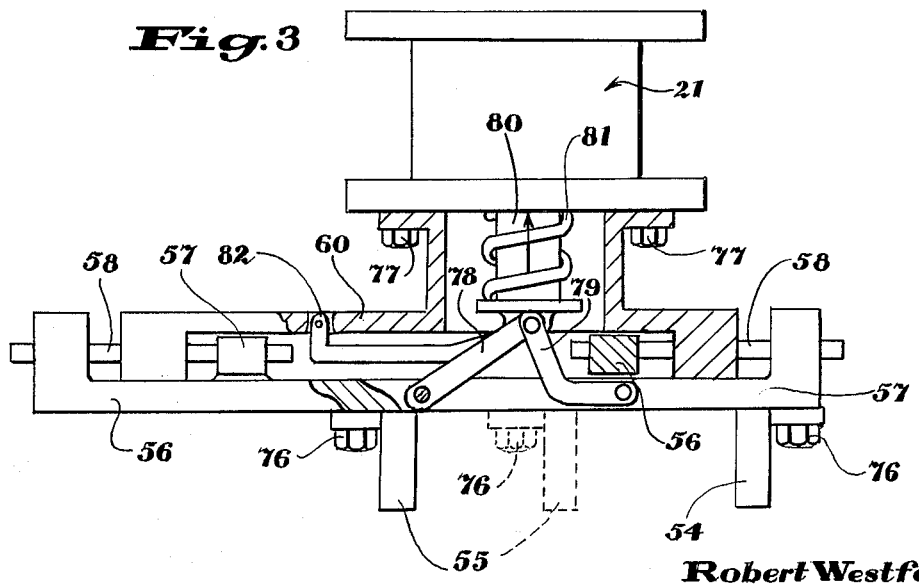
FIG. 3 is an elevation view partially in section of the component handling tool shown in FIG. 1.

As shown in greater detail in FIG. 3, the jaws 54 and 55 (one indicated in phantom) may be selectively spaced by use of locking bolts 76 to grasp components of various dimensions. Also the support 60 is rotatably secured by means such as locking bolts 77 so that the jaws may grasp a part either longitudinally or laterally of the bedplate 13. The support slides 56 and 57 are directly driven by lever bars 78 and 79 respectively with the lever bar 79 being V-shaped to avoid interference contact with a support leg of the support bar 57.

In the particular embodiment as shown in FIG. 3, an armature 80 of the solenoid of the clamping arrangement 21 is pulled upward against the bias of a spring 81 preparatory to the grasping of a component. Thus, the driven end of the lever bars 78 and 79 moves upward and the driving ends move inward, pulling the support slides 56 and 57 together symmetrically. When the solenoid is de-energized, grasping is accomplished by the spring bias. Thus the jaw 54 moves to the left with the forward support slide 56 and the jaw 55 moves to the right with the rear support slide 57. Such relative movement compresses the lever bars 78 and 79 and makes them effective where the angle between the bars and the line of motion of the support slides is very small. Such a large mechanical advantage allows the relatively soft spring 81 to grasp tightly a component having hard and slippery surfaces.

Because of precise positioning problems, I prefer that the exact position of the armature 80 is assured by means of another lever bar 82 coupling the end of the armature 80 to the horizontal support 60. I have also found that having both pivot points of the lever bar 82 at the same height improves the precision of the positioning of a part.

While I have shown and described particular embodiments of the present invention, other modifications may occur to those skilled in this art. For instance, to convert the clamping arrangement 21 to an internal grip, it is necessary only to interchange jaws 54 and 55 so that they are mounted on support bars 57 and 56 respectively. If gripping under power with a spring used to release the jaws is preferred, then the first described arrangement may be used for internal gripping and the second arrangement for external gripping. I intend, therefore, to have the appended claims cover all such modifications which fall within the true spirit and scope of my invention.

I claim:

1. An assembly machine utilizing a positioning carriage for severing a component and placing it in a predetermined location on a work piece, comprising:
   a bedplate;
   a cutter assembly supported on said bedplate;
   a laterally movable element supported on said bedplate;
   a rotatable element supported on said laterally movable element;
   an actuating roller, supported on said rotatable element and, driveable therewith to actuate said cutter assembly for severing preformed components from a supply strip thereof; and
   a clamping device driveable by the positioning carriage to grasp the severed component at one location and convey it to the work piece precisely positioned relative to said bedplate.

2. An assembly machine in accordance with claim 1 wherein said clamping device comprises:
   a pair of support slides slidingly supported on a horizontal support member;
   a solenoid;
   a pair of jaws on said support slides and extending outward thereon from said solenoid;
   an armature driveable vertically by said solenoid; and
   a pair of lever bars coupling said armature to said support slides for driving them relative to each other to operate said jaws for grasping the component.

3. An assembly machine in accordance with claim 2 wherein said clamping device is nonrotatably securable to said laterally movable element to grasp the component during severance thereof by said cutter assembly.

4. An assembly machine in accordance with claim 3 wherein said actuating roller engages said cutter assembly only during the portion of the movement of said rotatable element providing substantially maximum mechanical advantage.

5. An assembly machine utilizing positioning means for severing a component and for placing it in a predetermined location on a work piece, comprising:
   a bedplate;
   a cutter assembly supported on said bedplate;
   a laterally movable element being a portion of the positioning means and supported on said bedplate;
   a rotatable element supported on said laterally movable element;
   an actuating roller journaled on the periphery of said rotatable element and, driveable by said rotatable element to actuate said cutter assembly when positioned thereover by said laterally movable element for severing preformed components from a supply strip thereof;
   a vertically orientable tool slide journaled on said rotatable element; and
   a clamping device driveable by said slide to a position for grasping the severed component and conveying it to the work piece precisely positioned relative to said bedplate.

6. An assembly machine in accordance with claim 5 wherein said clamping device comprises:
   a pair of support slides slidingly supported on a horizontal support member;
   a solenoid;
   a pair of jaws on said support slides respectively and extending outwardly thereon from said solenoid;
   an armature driveable vertically by said solenoid;
   a pair of lever bars coupling said armature to said support slides respectively for driving them relative to each other to cause said jaws to grasp the component; and
   control means for said clamping device and said actuating roller to operate said clamping device to grip the component prior to the cutting operation and to convey it to the work piece after the cutting operation.

7. An assembly machine in accordance with claim 6 wherein said tool slide is driveable vertically by a drive rod rotatable by said rotatable element; and resilient guide means support said clamping device to allow vertical motion thereof relative to said guide means during rotation of said rotatable element during the severing operation.

8. An assembly machine utilizing positioning means for severing a component and for placing it in a predetermined location on a work piece, comprising:
   a bedplate;
   a cutter assembly supported on said bedplate;
   a precisely controlled stepping motor secured to said bedplate;
   a laterally movable element being a portion of the positioning means supported on said bedplate and driveable by said motor;
   a rotatable element supported on said laterally movable element;
   an actuating roller supported on said rotatable element and, driveable thereby for severing preformed components from a supply strip thereof; and
   a clamping device driveable by said motor with said laterally movable element for grasping the severed component and conveying it to the work piece precisely positioned relative to said bedplate.

9. An assembly machine in accordance with claim 8 wherein said clamping device comprises:
   a pair of support slides slidingly supported on a horizontal support member;
   a solenoid;
   a pair of jaws on said support slides respectively and extending outwardly thereon from said solenoid;
   an armature driveable vertically by said solenoid; and
   a pair of lever bars coupling said armature to said support slides respectively for driving them relative to each other to grasp the component.

10. An assembly machine utilizing positioning means for severing a component and placing it in a predetermined location on a work piece, comprising:
    a bedplate;
    a cutter assembly supported on said bedplate;
    a precisely controllable stepping motor secured to said bedplate;
    a laterally movable element being a portion of the positioning means supported on said bedplate and driveable by said motor;
    a rotatable element journaled on said laterally movable element, and rotatable by said motor;
    an actuating roller supported on the periphery of said rotatable element and, driveable thereby to a position close to said bedplate, to actuate with said cutter assembly for severing preformed components from a supply strip thereof;

a tool slide driveable vertically during rotation of said rotatable element; and a clamping device resiliently supported in vertical guide ways secured to said tool slide for grasping the component prior to its being severed and after severance conveying it to the work piece precisely positioned relative to said bedplate.

11. An assembly machine in accordance with claim 10 wherein said clamping device comprises:

a pair of support slides slidingly supported on a horizontal support member;

a solenoid;

a pair of jaws on said support slides respectively and extending outwardly thereon from said solenoid;

an armature driveable vertically by said solenoid;

a pair of lever bars coupling said armature to said support slides for driving them relative to each other to grasp the component; and control means for said motor, said clamping device and said actuating roller to operate said clamping device to grip the component prior to the cutting operation and to convey it to the work piece after the cutting operation.

12. An assembly machine utilizing positioning means for placing a component in a predetermined location on a precisely positioned work piece, comprising:

a bedplate;

a precisely controllable stepping motor secured to said bedplate;

a movable element being a portion of the positioning means supported on said bedplate and driveable by said motor;

a clamping device mounted on said movable element for grasping the component and conveying it to the work piece, said clamping device comprising:

a pair of support slides slidingly supported on a horizontal support member;

a solenoid mounted perpendicular to said support slides;

a pair of jaws on said support slides respectively and extending outwardly thereon from said solenoid;

an armature driveable vertically by said solenoid;

a pair of lever bars coupling said armature to said support slides for driving them relative to each other to grasp the component; and control means for said motor and said clamping device, to position said clamping device to grasp the component, convey it to the work piece, and there release it.

13. In an assembly machine utilizing positioning means for placing a component in a predetermined location on a work piece precisely positioned relative to a bedplate having a precisely controllable stepping motor secured thereto for driving a movable element thereover, a clamping device on the movable element for grasping the component and conveying it to the work piece, comprising:

a pair of support slides slidingly supported on a horizontal support member;

a solenoid;

a pair of jaws on said support slides respectively and extending outwardly thereon from said solenoid;

an armature driveable vertically by said solenoid; and a pair of lever bars coupling said armature to said support slides for driving them relative to each other to grasp the component.

14. In an assembly machine for placing a component in a predetermined location on a work piece precisely positioned relative to a bedplate having a precisely controllable stepping motor secured thereto for driving a movable element thereover, a clamping device on the movable element for grasping the component and conveying it to the work piece, comprising:

a horizontal support member;

a pair of support slides slidingly supported on and extending below said horizontal support member;

a solenoid secured above said support member;

a pair of parallel jaws adjustably secured on said support slides respectively and extending outwardly thereon from said solenoid;

an armature driveable vertically by said solenoid; and a pair of lever bars coupling said armature to said support slides respectively and being angled relative thereto for driving them relative to each other to grasp the component, said jaws being secured to said support slides at locations relative to the dimensions of the component such that the grasping force developed thereby is substantially greater than the force applied to said armature.

15. In an assembly machine for placing a component in a predetermined location on a work piece precisely positioned relative to a bedplate having a precisely controllable stepping motor secured thereto for driving a movable element thereover, a clamping device on the movable element for grasping the component and conveying it to the work piece, comprising:

a horizontal support member;

a pair of support slides slidingly supported on and extending below said horizontal support member;

a solenoid secured above said support member;

a pair of parallel jaws adjustably secured on said support slides respectively and extending outwardly thereon from said solenoid;

an armature driveable upward by said solenoid;

a return spring for driving said armature down;

a pair of lever bars coupling said armature to said support slides respectively and being angled relative thereto for driving them horizontally relative to each other to grasp the component, said jaws being secured to said support slides at locations relative to the dimensions of the component such that the grasping force developed is substantially greater than the force at said armature developed by said spring; and another lever bar coupling said armature to said horizontal support member to determine the lateral position of said armature during grasping and release of the component.

16. An assembly machine in accordance with claim 15 wherein said another lever bar is coupled to said armature and said horizontal support member at laterally spaced pivot points of equal elevation.

No references cited.

WILLIAM W. DYER, JR., *Primary Examiner.*

F. T. YOST, *Assistant Examiner.*